United States Patent
Agarwal et al.

(10) Patent No.: US 6,780,936 B1
(45) Date of Patent: Aug. 24, 2004

(54) DIENE-MODIFIED PROPYLENE POLYMER NUCLEATING AGENTS

(75) Inventors: Pawan K. Agarwal, Houston, TX (US); Armenag Dekmezian, Kingwood, TX (US); Aspy K. Mehta, Humble, TX (US); Weiqing Weng, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/364,056

(22) Filed: Feb. 11, 2003

(51) Int. Cl.[7] ............... C08L 9/00; C08L 23/00; C08L 23/04; C08L 25/02; C08L 45/00
(52) U.S. Cl. ............ 525/191; 525/210; 525/211; 525/216; 525/232; 525/240; 525/241
(58) Field of Search ............... 525/191, 210, 525/211, 216, 232, 240, 241

(56) References Cited

U.S. PATENT DOCUMENTS

| | | | |
|---|---|---|---|
| 4,338,228 A | 7/1982 | Inoue et al. | 524/120 |
| 4,585,817 A | 4/1986 | Su et al. | 524/108 |
| 5,130,371 A | 7/1992 | Fujita et al. | 525/64 |
| 5,137,973 A | 8/1992 | Khanna et al. | 525/177 |
| 5,266,607 A | 11/1993 | Lucas et al. | 522/76 |
| 5,349,005 A * | 9/1994 | Tanaka | 524/490 |
| 5,670,595 A | 9/1997 | Meka et al. | 526/336 |
| 5,883,144 A | 3/1999 | Bambara et al. | 521/144 |
| 5,883,145 A | 3/1999 | Hurley et al. | 521/144 |
| 5,998,576 A | 12/1999 | Sadamitsu et al. | 530/210 |
| 6,043,303 A | 3/2000 | Kobayashi et al. | 524/109 |
| 6,103,775 A | 8/2000 | Bambara et al. | 521/144 |
| 6,113,822 A | 9/2000 | Adedeji | 264/48 |
| 6,245,843 B1 | 6/2001 | Kobayashi et al. | 524/109 |
| 6,300,415 B1 | 10/2001 | Okayama et al. | 525/191 |
| 6,306,518 B1 | 10/2001 | Shah et al. | 428/516 |
| 6,313,204 B1 | 11/2001 | Kobayashi | 524/109 |
| 6,316,512 B1 | 11/2001 | Bambara et al. | 521/144 |
| 6,329,454 B1 | 12/2001 | Krabbenborg et al. | 524/252 |
| 2001/0007896 A1 | 7/2001 | Agarwal et al. | 526/335 |
| 2002/0013440 A1 | 1/2002 | Agarwal et al. | 526/335 |

FOREIGN PATENT DOCUMENTS

| | | |
|---|---|---|
| WO | WO 00/01766 | 1/2000 |
| WO | WO 02/083753 | 10/2002 |

* cited by examiner

Primary Examiner—Nathan M. Nutter
(74) Attorney, Agent, or Firm—Paige Schmidt

(57) ABSTRACT

This invention relates to compositions derived from polyolefins combined with a polymeric nucleating agent. The nucleating agent is specifically a diene-propylene copolymer.

55 Claims, 1 Drawing Sheet

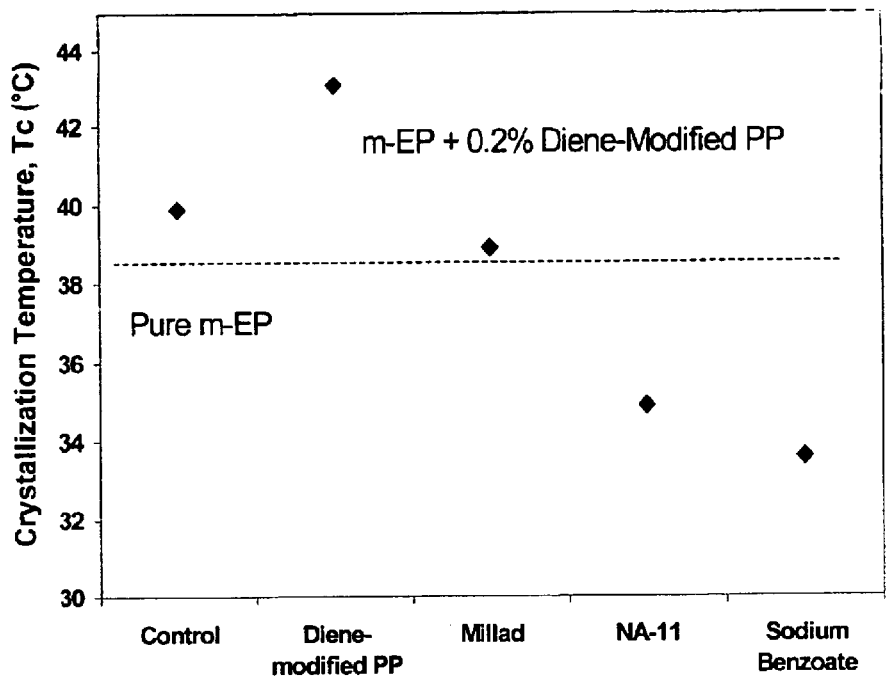
Figure 1. Tc of m-EP Products Containing 2000ppm of Various Nucleating Agents.
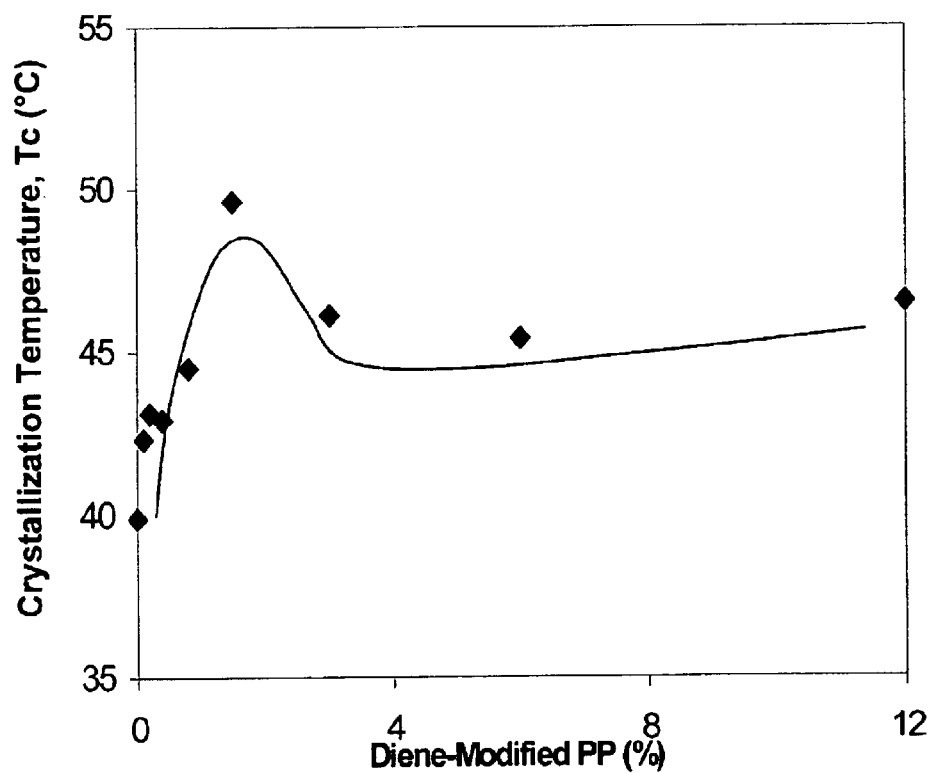
Figure 2. Tc of m-EP and its Blends with Diene-Modified PP.

DIENE-MODIFIED PROPYLENE POLYMER NUCLEATING AGENTS

FIELD

This invention relates to compositions derived from polyolefins combined with a polymeric nucleating agent. The nucleating agent is specifically a diene-propylene copolymer.

BACKGROUND

It is a common practice to use nucleating agents to increase the crystallization temperature (Tc) of polyolefins and/or to otherwise improve polyolefins by modifying their crystalline morphology. One reason for doing this is to increase melt processing efficiency and subsequent solid state strength-related properties. By increasing Tc, polyolefins crystallize or "freeze" at very near their melting temperature so that, for example, in molding processes, the polymer sets quickly after being injected into the mold.

There are many different types of nucleating agents used to increase the Tc of polyolefins. But because such agents are expensive and often impair other important polyolefin features, compounders and processors are constantly searching for nucleating agents that are economical and sufficiently increase Tc while not degrading other desirable polyolefin properties or introducing unwanted characteristics. The measurement of Tc is conveniently done utilizing differential scanning calorimetry (DSC) techniques.

Examples of common nucleating agents include inorganic substances such as talc, silicates, calcium carbonates, sodium phosphates, and stearates. Organic nucleating agents include polyesters, diacetals, dibenzylidene sorbitols, sodium benzoates, metal salts of carboxylic acids or alkyl-substituted derivatives thereof such as salts of stearic acids, adipic acid and sebacic acid, chromium p-tert-butyl benzoate and aluminum monophenyl acetate. Most common nucleating agent currently being used and recommended, specially for polypropylene family of polymers, are talc, sodium benzoate, and sorbitols.

We have discovered that diene-propylene copolymers serve as excellent nucleating agents for polyolefins, particularly propylene and ethylene based polyolefins.

SUMMARY

In one embodiment the present invention is a polymer composition comprising a blend of: a) from 0.01 to 30 weight percent diene-propylene copolymer based on the total polymer composition weight; and b) crystallizable polyolefin comprising from a minimum of 0 to less than 100 percent by weight propylene derived units.

In another embodiment the present invention is a polymer composition comprising a blend of: a) from 0.01 to 10 weight percent diene-propylene copolymer based on the total polymer composition weight; and b) crystallizable polyolefin comprising at least 5% by weight ethylene derived units.

In another embodiment the present invention is a polymer composition obtained by blending: a) from 0.01 to 30 weight percent diene-propylene copolymer based on the total polymer composition weight; and b) at least 50 weight percent crystallizable polyolefin comprising at least 5% by weight ethylene derived units; wherein the polymer composition has a Tc at least 3° C. greater than that of the crystallizable polyolefin alone.

In another embodiment one or more of the above compositions is prepared by combining the diene-propylene copolymer of a) with at least 50 weight percent of the crystallizable polyolefin of b) based on the total weight of the polymer composition.

In another embodiment one or more of the above blends has a Tc of at least 3° C. greater than that of the crystallizable polyolefin alone.

In one or more of the above compositions the crystallizable polyolefin is selected from the group consisting of: syndiotactic propylene homopolymer, isotactic propylene-ethylene copolymers, syndiotactic propylene-ethylene copolymer, isotactic $C_4$–$C_{10}$ homopolymer, isotactic propylene-alpha olefin ($C_4$–$C_{18}$) copolymer, polyethylene homopolymer, polyethylene-ethylene alpha olefin ($C_4$–$C_{18}$) copolymers, propylene-ethylene-alpha olefin ($C_4$–$C_{18}$) terpolymers, and propylene impact copolymers.

In one or more of the above compositions the crystallizable polyolefin is selected from the group consisting of: isotactic propylene-ethylene copolymers, isotactic propylene-alpha olefin ($C_4$–C18) copolymer, polyethylene homopolymer, ethylene alpha olefin ($C_4$–$C_{18}$) copolymers, propylene-ethylene-alpha olefin ($C_4$–$C_{18}$) terpolymers, and propylene impact copolymers.

In one or more of the above compositions the crystallizable polyolefin comprises at least 60 weight percent propylene derived units, and at least 5 weight percent ethylene derived units based on the total composition weight.

In one or more of the above compositions the crystallizable polyolefin comprises at least 80 weight percent propylene derived units based on the total composition weight.

In one or more of the above compositions the crystallizable polyolefin comprises at least 90 weight percent propylene derived units based on the total composition weight.

In one or more of the above compositions the crystallizable polyolefin comprises at least 95 weight percent propylene derived units based on the total composition weight.

In one or more of the above compositions the crystallizable polyolefin comprises an ethylene-propylene copolymer elastomer comprising 5 to 25% by weight ethylene-derived units and 95 to 75% by weight propylene-derived units, and has a melting point of less than 90° C.

In one or more of the above compositions the crystallizable polyolefin has a heat of fusion of from 1.0 J/g to 37 J/g and a molecular weight distribution (Mw/Mn) of from 1.5 to 5.

One or more of the above compositions is prepared by combining from 0.15 to 10 weight percent of the diene-propylene copolymer of a) with the crystallizable polyolefin of b).

One or more of the above compositions is prepared by combining from 0.15 to 8 weight percent of the diene-propylene copolymer of a) with the crystallizable polyolefin of b).

One or more of the above compositions is prepared by combining from 0.15 to 5 weight percent of the diene-propylene copolymer of a) with the crystallizable polyolefin of b).

One or more of the above compositions is prepared by combining from 0.20 to 5 weight percent of the diene-propylene copolymer of a) with the crystallizable polyolefin of b).

In one or more of the above compositions the diene-propylene copolymer of a) comprises propylene derived units and from 0.001 to 2.0 weight percent diene derived units.

In one or more of the above compositions the diene-propylene copolymer of a) comprises propylene derived units and from 0.003 to 1.5 weight percent diene derived units.

In one or more of the above compositions the diene-propylene copolymer of a) comprises propylene derived units and from 0.005 to 1.0 weight percent diene derived units.

In one or more of the above compositions the diene-propylene copolymer of a) consists essentially of propylene derived units and from 0.01 to 2.0 weight percent diene derived units.

DRAWINGS

FIG. 1 shows the crystallization temperature of metallocene ethylene/propylene copolymers with various nucleating agents including the diene-PP.

FIG. 2 demonstrates the influence of diene-PP concentration on crystallization temperature of the blends.

DEFINITIONS

Polyolefins are one or more substances formed by the polymerization in any process of one or more olefins of the formula: $R_1R_2C=CH_2$ wherein: $R_1$ and $R_2$ are the same or different and are hydrogen or substituted or unsubstituted alkylphenyl, cycloalkyl, phenylalkyl or alkyl.

Crystallizable means that the polyolefin displays a measurable melting point (Tm) and crystallization temperature (Tc) when analyzed by techniques such as differential scanning calorimetry (DSC).

Copolymers are polymers having units derived from two or more monomer types which may be arranged randomly, in blocks or in multiple phases such as occurs in impact copolymers. When referring to a specific type of copolymer, the first named olefin makes up a majority of the copolymer. For example, a "propylene-ethylene" copolymer will have more than 50 weight percent propylene derived units based on the total weight of the copolymer.

Terpolymers are polymers having units derived from three or more monomer types which may be arranged randomly, in blocks or in multiple phases such as occurs in impact copolymers.

Dienes are nonconjugated diolefins which may be incorporated in polymers to create long branches or to facilitate light chemical crosslinking reactions. "Substantially free of diene" is defined to be less than 1% diene, or less than 0.5% diene, or less than 0.1% diene, or less than 0.05% diene, or equal to 0%. All of these percentages are by weight in the copolymer. The presence or absence of diene can be conventionally determined by infrared, Theological or other techniques, well known to those skilled in the art.

In the description of the copolymer, and particularly when describing the constituents of the copolymer, in some instances, monomer terminology may be used. For example, terms such as "olefin", "propylene", "α,ω-diene", "ethylene" and other α-olefins can be used. When such monomer terminology is used to describe the copolymer constituents, it means the polymerized units of such monomers is present in the copolymer.

DESCRIPTION

The following is a description of specific embodiments of this invention. Examples are not intended to be limited thereby. Generally this invention is directed to compositions containing a blend of at least two components: (1) a diene-propopylene copolymer; and (2) a different crystallizable polyolefin. The purpose of the diene-propylene copolymer is to act as a nucleating agent for the crystallizable polyolefin. Thus the blend will contain a majority of crystallizable polyolefin and a minority of nucleating agent.

Suitable crystallizable polyolefins include: polystyrene, polyethylene, polypropylene (isotactic and syndiotactic), ethylene-propylene copolymers, propylene-ethylene copolymers, propylene-higher alpha olefin ($C_4$–$C_{18}$) copolymers, ethylene-higher alpha olefin ($C_4$–$C_{18}$) copolymers, , polyisobutylene, poly(1-pentene), poly(2-methylstyrene), poly(4methylstyrene), poly(1-hexene), poly(5-methyl-1-hexene), poly(4-methylpentene), poly(1-butene), poly(3-methyl-1-butene), poly(3-phenyl-1-propene), poly(1-octadecene), poly(vinyl cyclopentane), poly(vinylcyclohexane), poly(a-vinylnaphthalene), and blends of any two or more of these.

Preferred crystallizable polyolefins include: polyethylene, ethylene-propylene copolymers, propylene-ethylene copolymers, propylene-higher alpha olefin ($C_4$–$C_{18}$) copolymers, ethylene-higher alpha olefin ($C_4$–$C_{18}$) copolymers, poly(1-butene), poly(1-pentene), poly(1-hexene), poly(1-octene), and blends of any two or more of these.

Suitable crystallizable polyolefins may have weight average molecular weights that vary widely, for example from at least 1000, preferably to upwards of 1,000,000, as long as the polyolefin is crystallizable as defined above. Preferably, the polyolefin has a conventional DSC melting point (Tm) of from 50° C. to 230° C., more preferably from 60° C. to 175° C.

The crystallizable polyolefins suitable for use in this invention may be prepared by any process (for example: gas phase, solution, slurry, bulk, single and multiple stage processes using conventional, Ziegler-Natta, or metallocene catalysts and mixtures thereof). Many such polyolefins are available from commercial sources, but polyolefins produced with metallocene or single-site catalysts offer particular advantages. Primarily this derives from the molecular consistency of such polymers. Molecular weight distributions, at least of homopolymers, are narrow (Mw/Mn=1.5–4.0), and comonomers are more randomly distributed than would be obtained with multiple-site or Ziegler-Natta catalysts. In addition, for higher-alpha olefins ($C_3$–$C_{10}$), regio and insertion errors and defects can be reduced or at least controlled using metallocene or single-site catalysts. Many benefits derive from these and other basic characteristics, and it is certainly within the scope of this invention to take advantage of such benefits.

In one preferred embodiment, the crystallizable polyolefin contains from 0 to less than 100 weight percent propylene derived units.

In some embodiments, the crystallizable polyolefin is selected from thermoplastic polymer compositions composed of a majority of propylene with a minor amount of ethylene. These polymer compositions include a linear, homogeneous macromolecular copolymer structure. These polymers will have a Tc but a reduced level of crystallinity due to ethylene comonomer units in addition to the propylene units.

These thermoplastic polymer compositions include from a lower limit of 2% or 5% or 6% or 8% or 10% by weight to an upper limit of 20% or 25% or 28% by weight ethylene-derived units. These embodiments will also include propylene-derived units present in the range of from a lower limit of 72% or 75% or 80% by weight to an upper limit of 98% or 95% or 94% or 92% or 90% by weight. These percentages by weight are based on the total weight of the propylene and ethylene-derived units; i.e., based on the sum of weight percent propylene-derived units and weight percent ethylene-derived units being 100%. These compositions can comprise random copolymers or impact copolymers.

These thermoplastic polymer compositions include low crystallinity polymers having a heat of fusion, as determined by DSC, ranging from a lower limit of 1.0 J/g, or 3.0 J/g, or 5.0 J/g, or 10.0 J/g, or 15.0 J/g, or 20.0 J/g, to an upper limit of 125 J/g, or 100 J/g, or 75 J/g, or 57 J/g, or 50 J/g, or 47 J/g, or 37 J/g, or 30 J/g. As used herein, "heat of fusion" is measured using Differential Scanning Calorimetry (DSC), which can be measured using the ASTM E-794-95 procedure. About 2 mg to about 15 mg of a sheet of the polymer pressed at approximately 200° C. to 230° C. is removed with a punch die and is annealed at room temperature for 48 hours. At the end of the period, the sample is placed in a Differential Scanning Calorimeter (e.g. Perkin Elmer 7 Series Thermal Analysis System) and cooled to about −50° C. to −70° C. The sample is then heated at about 10° C./min to attain a final temperature of about 180° C. to about 200° C. The thermal output is recorded as the area under the melting peak of the sample which is typically at a maximum peak at about 30° C. to about 175° C. and occurs between the temperatures of about 0° C. and about 200° C. The thermal output is measured in joules/gram as a measure of the heat of fusion. The melting point is recorded as the temperature of the greatest heat absorption within the range of melting temperature of the sample. Without wishing to be bound by theory, we believe that in many cases these low crystallinity polymers have generally isotactic crystallizable propylene sequences, and the above heats of fusion are believed to be due to the melting of these crystalline segments.

The crystallinity of these low crystallinity thermoplastic polymers may also be expressed in terms of crystallinity percent. For example, the thermal energy for the highest order of isotactic polypropylene crystallinity is estimated at 189 J/g. That is, 100% isotactic crystallinity is equal to 189 J/g. Therefore, according to the aforementioned heats of fusion, the low crystallinity polymer has a polypropylene crystallinity within the range having an upper limit of 40%, or 30%, or 25%, or 20% and a lower limit of 3%, or 5%, or 7%, or 8%.

The level of crystallinity is also reflected in the melting point. The term "melting point" as used herein is the highest peak among principal and secondary melting peaks as determined by DSC, discussed above. The preferred low crystallinity thermoplastic polymers suitable for use in our invention, have a single melting point. Typically a sample of the polypropylene copolymer will show secondary melting peaks adjacent to the principal peak; the highest of these peaks is considered the melting point. The low crystallinity polymer preferably has a melting point by DSC ranging from an upper limit of 110° C., or 105° C., or 90° C. or 80° C., or 70° C.; to a lower limit of 20° C., or 25° C., or 30° C., or 35° C., or 40° C. or 45° C.

In some embodiments, the low crystallinity thermoplastic polymer has a weight average molecular weight (Mw) of from 10,000–5,000,000 g/mol, or from 20,000 to 1,000,000 g/mol, or from 80,000 to 500,000 g/mol and a molecular weight distribution Mw/Mn (MWD), sometimes referred to as a "polydispersity index" (PDI), ranging from a lower limit of 1.5 or 1.8 to an upper limit of 40 or 20 or 10 or 5 or 3.

The Mw and MWD, as used herein, can be determined by a variety of methods, including those in U.S. Pat. No. 4,540,753 to Cozewith, et al., and references cited therein, or those methods found in Verstrate et al., *Macromolecules*, v. 21, p. 3360 (1988), the descriptions of which are incorporated by reference.

In some embodiments, this low crystallinity polymer has a Mooney viscosity ML (1+4)@125° C. of 100 or less, preferably 75 or less, more preferably 60 or less, and more preferably 30 or less. Mooney viscosity, as used herein, can be measured as ML/1+4 at 125° C. according to ASTM D1646, unless otherwise specified.

The tacticity index, expressed herein as "m/r", is determined by $^{13}C$ nuclear magnetic resonance (NMR). The tacticity index m/r is calculated as defined in H. N. Cheng, *Macromolecules*, 17, 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50. The low crystallinity elastomers used in the invention can have a tacticity index m/r ranging from a lower limit of 4 or 6 to an upper limit of 8 or 10 or 12.

An ancillary procedure for the description of the tacticity of propylene units is the use of triad tacticity. The triad tacticity of a polymer is the relative tacticity of a sequence of three adjacent propylene units, a chain consisting of head to tail bonds, expressed as a binary combination of m and r sequences. It is usually expressed for copolymers as the ratio of the number of units of the specified tacticity to all of the propylene triads in the copolymer.

The triad tacticity (mm fraction) of a propylene copolymer can be determined from a $^{13}C$ NMR spectrum of the propylene copolymer and the following formula:

$$\text{mm Fraction} = \frac{\text{PPP (mm)}}{\text{PPP (mm)} + \text{PPP (mr)} + \text{PPP (rr)}}$$

where PPP(mm), PPP(mr) and PPP(rr) denote peak areas derived from the methyl groups of the second units in the following three propylene unit chains consisting of head-to-tail bonds:

PPP(mm):

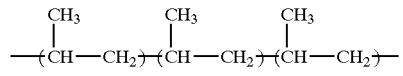

PPP(mr):

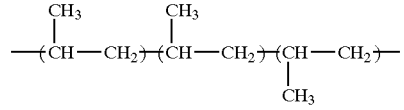

PPP(rr):

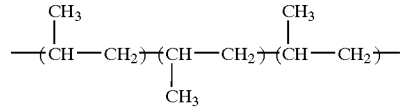

The $^{13}C$ NMR spectrum of the propylene copolymer is measured as described in U.S. Pat. No. 5,504,172. The spectrum relating to the methyl carbon region (19–23 parts per million (ppm)) can be divided into a first region (21.2–21.9 ppm), a second region (20.3–21.0 ppm) and a third region (19.5–20.3 ppm). Each peak in the spectrum was assigned with reference to an article in the journal *Polymer*, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm).

The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

In some embodiments, the low crystallinity polymers useful as the crystallizable polyolefin in our invention have a triad tacticity of three propylene units, as measured by $^{13}$C NMR, of greater than 75%, or greater than 80%, or greater than 82%, or greater than 85%, or greater than 90%.

In one embodiment, the low crystallinity thermoplastic polymer further includes a non-conjugated diene monomer to aid in the vulcanization and other chemical modification of the polymer blend composition. The amount of diene is preferably less than 10 weight %, and more preferably less than 5 weight %. The diene may be any non-conjugated diene which is commonly used for the vulcanization of ethylene propylene rubbers including, but not limited to, ethylidene norbornene, vinyl norbornene, or dicyclopentadiene.

In other embodiments of the present invention, these low crystallinity thermoplastic polymers are substantially free of diene-derived units.

The low crystallinity polymer may be produced by any process that provides the desired polymer properties, in heterogeneous polymerization on a support, such as slurry or gas phase polymerization, or in homogeneous conditions in bulk polymerization in a medium comprising largely monomer or in solution with a solvent as diluent for the monomers. For industrial uses, continuous polymerization processes are preferred. Homogeneous polymers are often preferred in the invention. For these polymers, preferably the polymerization process is a single stage, steady state, polymerization conducted in a well-mixed continuous feed polymerization reactor. The polymerization can be conducted in solution, although other polymerization procedures such as gas phase or slurry polymerization, which fulfil the requirements of single stage polymerization and continuous feed reactors, are contemplated.

The low crystallinity polymers may be made advantageously by the continuous solution polymerization process described in WO 02/34795, advantageously in a single reactor and separated by liquid phase separation from the alkane solvent.

The low crystallinity polymers of the present invention may be produced in the presence of a chiral metallocene catalyst with an activator and optional scavenger. The use of single site catalysts is preferred to enhance the homogeneity of the low crystallinity polymer. As only a limited tacticity is needed, many different forms of single site catalyst may be used. Possible single site catalysts are metallocenes, such as those described in U.S. Pat. No. 5,026,798, which have a single cyclopentadienyl ring, advantageously substituted and/or forming part of a polycyclic structure, and a heteroatom, generally a nitrogen atom, but possibly also a phosphorus atom or phenoxy group connected to a group 4 transition metal, preferably titanium but possibly zirconium or hafnium. A farther example is Me$_5$CpTiMe$_3$ activated with B(CF)$_3$ as used to produce elastomeric polypropylene with an Mn of up to 4 million. See Sassmannshausen, Bochmann, Rosch, Lilge, *J. Organomet. Chem.* (1997), vol 548, pp. 23–28.

Other possible single site catalysts are metallocenes which are bis cyclopentadienyl derivatives having a group 4 transition metal, preferably hafnium or zirconium. Such metallocenes may be unbridged as in U.S. Pat. Nos. 4,522, 982 or 5,747,621. The metallocene may be adapted for producing the low crystallinity polymer comprising predominantly propylene derived units as in U.S. Pat. No. 5,969,070 which uses an unbridged bis(2-phenyl indenyl) zirconium dichloride to produce a homogeneous polymer having a melting point of above 45° C. The cyclopentadienyl rings may be substituted and/or part of polycyclic systems as described in the above U.S. patents.

Other possible metallocenes include those in which the two cyclopentadienyls are connected through a bridge, generally a single atom bridge such as a silicon or carbon atom with a choice of groups to occupy the two remaining valencies. Such metallocenes are described in U.S. Pat. No. 6,048,950 which discloses bis(indenyl)(dimethylsilyl) zirconium dichloride and MAO; WO 98/27154 which discloses a dimethylsilyl bridged bisindenyl hafnium dimethyl together with a non-coordinating anion activator; EP 1070087 which discloses a bridged biscyclopentadienyl catalyst which has elements of asymmetry between the two cyclopentadienyl ligands to give a polymer with elastic properties; and the metallocenes described in U.S. Pat. Nos. 6,448,358 and 6,265,212.

The manner of activation of the single site catalyst can vary. Alumoxane and preferably methyl alumoxane (MAO) may be used. Higher molecular weights may be obtained using non-or weakly coordinating anion activators (NCA) derived and generated in any of the ways amply described in published patent art such as EP 277004, EP 426637, and many others. Activation generally is believed to involve abstraction of an anionic group such as the methyl group to form a metallocene cation, although according to some literature zwitterions may be produced. The NCA precursor may be an ion pair of a borate or aluminate in which the precursor cation is eliminated upon activation in some manner, e.g. trityl or ammonium derivatives of tetrakis pentafluorophenyl boron (See EP 277004). The NCA precursor may be a neutral compound such as a borane, which is formed into a cation by the abstraction of and incorporation of the anionic group abstracted from the metallocene (See EP 426638).

In one embodiment, the low crystallinity polymer used in the present invention is described in detail as the "Second Polymer Component (SPC)" in WO 00/69963, WO 00/01766, WO 99/07788, WO 02/083753, and described in further detail as the "Propylene Olefin Copolymer" in WO 00/01745, all of which are fully incorporated by reference.

Certain specific embodiments include a copolymer with a specified ethylene composition. The ethylene composition of a polymer can be measured as follows. A thin homogeneous film is pressed at a temperature of about 150° C. or greater, then mounted on a Perkin Elmer PE 1760 infrared spectrophotometer. A full spectrum of the sample from 600 cm$^{-1}$ to 4000 cm$^{-1}$ is recorded and the monomer weight percent of ethylene can be calculated according to the following equation: Ethylene wt %=82.585−111.987X+ 30.045 X$^2$, wherein X is the ratio of the peak height at 1155 cm$^{-1}$ and peak height at either 722 cm$^{-1}$ or 732 cm$^{-1}$, whichever is higher. The concentrations of other monomers in the polymer can also be measured using this method.

Comonomer content of discrete molecular weight ranges can be measured by Fourier Transform Infrared Spectroscopy (FTIR) in conjunction with samples collected by GPC. One such method is described in Wheeler and Willis, *Applied Spectroscopy*, (1993), vol. 47, pp. 1128–1130. Different but similar methods are equally functional for this purpose and well known to those skilled in the art.

Comonomer content and sequence distribution of the polymers can be measured by $^{13}$C nuclear magnetic resonance ($^{13}$C NMR), and such method is well known to those skilled in the art.

Again, this invention is directed to compositions containing a blend of the crystallizable polyolefin component of which various embodiments are described above, and a diene-propopylene copolymer that acts as a nucleating agent. Examples of diene-propylene copolymers include those described in U.S. Pat. Application Nos. 20010007896 and 20020013440 as well as U.S. Pat. No. 5,670,595, each of which is fully incorporated herein by reference.

Preferred diene-propylene copolymers include copolymerization reaction products, preferably metallocene-based copolymerization reaction products, of one or more olefin monomers, in which one such olefin monomer is propylene, and one or more diene monomers. The preferred dienes are α,ω-diene dienes.

Generally, olefins are present in the copolymer at from 98 to 99.999 wt %. In most embodiments, the diene content of the copolymer is greater than or equal to 0.001 wt % up to and including 5 wt %. But specific embodiments can have a variety of diene contents. For example, embodiments with minimum diene contents of 0.003 and 0.005 wt % are within the invention's scope. Similarly, embodiments with maximum diene contents of 5, 1 and 1.5 wt % are also within the invention's scope.

Some embodiments that have two or more different olefin units have propylene olefin units, which may be present in the copolymer in the range from 90.05 wt % to 99.999 wt % of the copolymer. These embodiments may additionally have other olefin units such as ethylene. These embodiments typically have other-olefin content from 0.05 to 8 wt %. But specific embodiments have other-olefin content minimums of 0.1 wt % and 0.5 wt %. Similarly, some embodiments have other-olefin content maximums 6 wt % and 3 wt % of the copolymer. α,ω-diene(s) typically are present at from 0.001 wt % to 2 wt % of the copolymer. But specific embodiments have α,ω-diene(s) content minimums of from 0.003 wt % and from 0.005 wt %. Similarly, other embodiments have α,ω-diene(s) content maximums of 5 wt %, 1.5 wt % and 1.0 wt % of the copolymer Still more preferably, the copolymer includes: propylene units in the range from 90 wt % to 99.999 wt % of the copolymer; C$_2$ or other α-olefin(s) units in the range from 0.00 wt % to 8 wt %, more preferably in the range from 0.1 to 6 wt % and even more preferably in the range from 0.5 wt % to 3 wt % of the copolymer. The α,ω-diene(s) units are present in the copolymer in the range from 0.001 wt % to 2 wt %, more preferably in the range from 0.003 wt % to 1.5 wt % and more still more preferably in the range from 0.005 wt % to 1.0 wt % of the copolymer.

The copolymer preferably has a weight average molecular weight in the range from 50,000 to 2,000,000, more preferably from 70,000 to 1,000,000 and even more preferably from 100,000 to 750,000. The copolymer has a molecular weight distribution (MWD) in the range from 1.5 to 15, more preferably from 2 to 10, and even more preferably from 2 to 8.

The copolymer preferably has a crystallization temperature (without externally added nucleating agents) in the range from 100° C. to 135° C., and more preferably from 105° C. to 130C., and still more preferably from 110° C. to 126° C. The copolymer may have two crystalline populations. Preferably in such cases, the melting point range of one of the crystalline populations is distinguishable from the melting point range of another crystalline population by a temperature range of from 1° C. to 16° C. More preferably, one of the crystalline populations has a melting point in the range from 140° C. to 165° C. and the other crystalline population has a melting point in the range from 142° C. to 148° C.

The copolymer may have a melt flow rate (MFR) in the range of from 0.1 dg/min to 100 dg/min, preferably from 0.5 dg/min to 50 dg/min, even more preferably from 1.0 dg/min to 35 dg/min. MFR is determined according to ASTM D-1238, condition L (2.16 kg, 230° C). The melting point of the copolymer may be less than 165° C., and preferably less than 160° C. Upper limits for melting point depend on the catalyst and polymerization details but would typically not be higher than 165° C. The hexane extractable level (as measured by 21 CFR 177.1520(d)(3)(i)) of the copolymer may be less than 2.0 wt %, and is preferably less than 1.0 wt %.

The copolymer may include blends, including reactor blends with α-olefins, particularly homopolymers. A typical reactor blend with linear polypropylene and particularly metallocene catalyzed polypropylene is representative.

The copolymer may further be described as "branched". As used herein, the term "branched" means one or more α,ω-diene unit linkages, desirably at the α,ω positions of the α,ω-diene unit, between two or more polymer chains formed by the polymerization of one or more α-olefins.

Examples of suitable α,ω-dienes include α,ω-dienes that contain at least 7 carbon atoms and have up to about 30 carbon atoms, more suitably are α,ω-dienes that contain from 8 to 12 carbon atoms. Representative examples of such α,ω-dienes include 1,6heptadiene, 1,7-octadiene, 1,8-nonadiene, 1,9-decadiene, 1,10-undecadiene, 1,11-dodecadiene, 1,12-tridecadiene, 1,13-tetradecadiene, and the like. Of these, 1,7-octadiene, and 1,9-decadiene are more desirable; particularly desirable is 1,9-decadiene. The diene content can be estimated, for example, by measuring absorbence at 722 cm$^{-1}$ using infrared spectroscopy. Branched, substituted α,ω-dienes, for example 2-methyl-1,9-decadiene, 2-methyl-1,7-octadiene, 3,4-dimethyl-1,6-heptadiene, 4-ethyl-1,7-octadiene, or 3-ethyl-4-methyl-5-propyl-1,10-undecadiene are also envisioned.

Note that while α,ω-dienes are preferred, other dienes can also be employed to make the copolymers useful in this invention. These would include cyclic dienes, such as vinylnorbornene, or aromatic types, such as divinyl benzene.

As with the polyolefins, metallocene produced diene-propylene copolymers are particularly useful for the same reasons described above.

The copolymer, which is the copolymerization reaction product of α,ω-diene(s) and olefin(s), may be prepared by slurry polymerization of the olefins and diene under conditions in which the catalyst site remains relatively insoluble and/or immobile so that the polymer chains are rapidly immobilized following their formation. Such immobilization is affected, for example, by (1) using a solid, insoluble catalyst, (2) conducting the copolymerization in a medium in which the resulting copolymer is generally insoluble, and (3) maintaining the polymerization reactants and products below the crystalline melting point of the copolymer.

Generally, the metallocene supported catalyst compositions described above are useful for copolymerizing $\alpha,\omega$-dienes and olefins. The polymerization processes suitable for copolymerizing $\alpha,\omega$-dienes and olefins, and particularly $\alpha$-olefins, are well known by those skilled in the art and include solution polymerization, slurry polymerization, and low pressure gas phase polymerization. Metallocene supported catalysts compositions are particularly useful in the known operating modes employing fixed-bed, moving-bed, fluid-bed, or slurry processes conducted in single, series or parallel reactors.

Generally, any of the above polymerization process may be used. When propylene is the selected olefin, a common propylene polymerization process is one that is conducted using a slurry process in which the polymerization medium can be either a liquid monomer, like propylene, or a hydrocarbon solvent or diluent, advantageously aliphatic paraffin such as propane, isobutane, hexane, heptane, cyclohexane, etc. or an aromatic diluent such as toluene. In this instance, the polymerization temperatures may be those considered low, e.g., less than 50° C., desirably 0° C.–30° C., or may be in a higher range, such as up to about 150° C., desirably from 50° C. up to about 80° C., or at any ranges between the end points indicated. Pressures can vary from about 100 to about 700 psia (0.69–4.8 MPa). Additional description is given in U.S. Pat. Nos. 5,274,056 and 4,182,810 and WO 94/21962 which are each fully incorporated by reference.

More particularly, the polymerization method of forming a propylene/$\alpha,\omega$-diene copolymer includes contacting a catalyst, and desirably a metallocene catalyst, under suitable polymerization conditions with polymerizable reactants, such as propylene monomers, and $\alpha,\omega$-diene monomers and recovering the propylene/$\alpha,\omega$-diene copolymer. The preferred metallocene catalyst is a zirconocene. Additionally, the contacting step may include hydrogen and ethylene monomers. The hydrogen, in ppm, may be present in the range of 100 to 50,000 and desirably from 500 to 20,000 and most desirably from 1,000 to 10,000 measured as gas phase concentration in equilibrium with liquid propylene at polymerization temperatures. The $\alpha,\omega$-diene monomers, in wt % based upon the total weight of the monomers introduced into the polymerization reactor, may be present in the range of 0.001 to 2 and desirably from 0.003 to 2 and more desirably from 0.003 to 1.5. The ethylene monomer, in wt % based upon the total weight of the monomers introduced into the polymerization reactor, may be present in the range of 0 to 8 and desirably from 1 to 7 and more desirably from 2 to 6. The polymerizable reactants, in wt % based upon the total weight of the monomer(s) and other chemicals introduced into the polymerization reactor, may be present in the range of 90 to 99.999 and desirably from 93 to 99.997 and more desirably from 95 to 99.995.

Generally it is thought best to use the minimum amount of nucleating agent necessary, i.e., an effective amount, although the diene-propylene copolymers described herein may well provide additional advantages beyond nucleation which would warrant the use of more than the minimum amount necessary for the desired Tc. Preferred weight percentages of diene-propylene copolymer in the blend generally have a lower limit of 0.01, or 0.02, or 0.10 or 0.15, or 0.20, or 0.25, or 0.30 weight percent, and an upper limit of 30, or 25, or 20, or 15, or 10, or 8, or 6, or 5. weight percent based on the total weight of the blend.

Conversely, the preferred weight percentages of crystallizable polyolefin in the blend have an upper limit of 99.99 or 99.90, or 99.80, or 99.0 and a lower limit of 70.0, or 75.0, or 80.0, or 85.0, or 90.0 based on the total weight of the blend.

The polyolefin component or components preferably make up essentially the rest of the composition, i.e., it is ideal to minimize the use of additives although their use is certainly contemplated. Non-polymeric additives include, for example, process oil, flow improvers, fire retardants, antioxidants, plasticizers, pigments, vulcanizing or curative agents, vulcanizing or curative accelerators, cure retarders, processing aids, flame retardants, tackifying resins, and the like. These compounds may include fillers and/or reinforcing materials. These include carbon black, clay, talc, calcium carbonate, mica, silica, silicate, combinations thereof, and the like. Other additives, which may be employed to enhance properties, include antiblocking agents, and a coloring agent. Lubricants, mold release agents, nucleating agents, reinforcements, and fillers (including granular, fibrous, or powder-like) may also be employed. Nucleating agents and fillers tend to improve rigidity of the article. The list described herein is not intended to be inclusive of all types of additives, which may be employed with the present invention. Effective additive levels are known in the art and depend on the details of the base polymer, the fabrication mode and the desired end application. Particularly suitable additives include stabilizers and neutralizers.

The components described above as well as additional additives and components may be physically blended together using techniques well known in the art. Alternatively, the polyolefin and diene-propylene copolymer(s) may be polymerized and intimately blended in a single, series or multiple stage polymerization process and additives physically blended thereafter. This approach has obvious advantages.

Ideally, the presence of diene-propylene nucleating agent as described above improves the Tc by at least 3° C., more preferably at least 5° C., even more preferably at least 7° C., still more preferably 10° C. or more.

The compositions of this invention are thermoplastic. When softened or melted with heat, they can be formed or molded using techniques such as compression molding, injection molding, gas assisted injection molding, calendering, vacuum forming, thermoforming, rotomolding, extrusion and/or blow molding. They can be spun, drawn into films, fibers and laminates of single or multiple layers. These compositions are particularly useful for injection molding. Examples of resulting articles include: automotive trims both exterior and interior, electrical equipment, household and personal articles, appliances, etc.

EXAMPLES

General

Polymerization was conducted in a series of two 150 gallon stirred tanks, auto refrigerated boiling liquid reactor. Polymerization grade propylene monomers were purified by passing first through basic alumina activated at 600° C., followed by molecular sieves activated at 600° C. 1,9-decadiene (96%) was purchased from Aldrich-Sigma Bulk Chemicals and used as received.

Catalyst Preparation

All catalyst preparations were performed in an inert atmosphere with <1.5 ppm $H_2O$ content. The silica support, available from Grace Davison, a subsidiary of W.R. Grace Co.-Conn. as Sylopol® 952 having $N_2$ pore volume 1.63 cc/g and a surface area of 312 m$^2$/g was calcined at 600° C. under a dry nitrogen flow for 8–24 hours to achieve a hydroxyl content of 0.8 to 1.2 mmol/g silica.

In a nitrogen purged dry glove box, the calcined silica (500 g) was charged to vessel that was equipped with an overhead stirrer. A solution of tris(perfluorophenyl)boron (30 g, 0.059 mole) in hexane (2 L), was added to silica followed by addition of N.N-diethylaniline (9.6 ml, 0.061 mole). The mixture was stirred at 49° C. for 1 hour. In a separate container, dimethylsilylbis(2-methyl-4-phenyl indenyl)zirconium dimethyl (4.5 g, 0.0077 mole), hexane (820 mL), triethylaluminium (187 mL, 25 wt % in heptane), and 1,9-decadiene (10 mL) were mixed to form a slurry. The 1,9-decadiene is used in this instance as a Lewis base to stabilize the catalyst, for instance by improving its shelf life. Other Lewis bases, such as other dienes including those described above and styrene, are known to be suitable for stabilizing the catalyst and may also be used. The slurry was then transferred to the silica-containing vessel, and the mixture was stirred at 49° C. for additional 1 hour. The solvent was removed by purging with nitrogen for 14 hours, and a free flowing solid catalyst was obtained. Metallocene loading was 0.015 mmol of transition metal per gram of catalyst.

Synthesis of Diene-Modified Propylene Polymers

Propylene/diene copolymers were produced in a series of two 150 gallon stirred tanks, auto refrigerated boiling liquid reactors. The conditions in the two reactors were as follows:

|  | Reactor 1 | Reactor 2 |
| --- | --- | --- |
| Reaction Temperature (° F.) | 165 | 155 |
| Propylene flow rate (lb/hr) | 175 | 65 |
| Gas phase H$_2$ conc. (ppm) | 3500–2500 | 3500–2500 |
| Solid Concentration (wt %) | 25–30 | 25–30 |

All polymers were made with varying levels of 1,9-decadiene (4.5–9.5% in hexane) charged to reactor 1. H$_2$ concentration was adjusted to obtain the polymers with desired MFR.

Polymer Characterization

Melt flow rate (MFR) of the polymers was measured using ASTM D-1238 at 230° C. and 2.16 kg load. Molecular weight of the polymers was analyzed by GPC using Waters 150° C. high temperature system with a DRI detector and Showdex AT-806MS column. Melting and crystallization temperatures of the polymers were measured on a TA Instrument DSC-912 using a heating and cooling rate of 10° C./min with a starting temperature of 0° C. and a stopping temperature of 250° C. The melting temperatures reported were obtained from the second melt. The mechanical properties were measured using ASTM-1708 microtensile testing procedure.

Ethylene Propylene Copolymers (m-EP)

The ethylene propylene copolymers were made in a 9 liter Continuous Flow Stirred Tank Reactor using hexane as the solvent. The liquid full reactor has a residence time of 9 minutes and the pressure is maintained at 700 kPa. A mixed feed of hexane, ethylene and propylene is pre-chilled to approximately −30° C. to remove the heat of polymerization, before entering the reactor. Solutions of catalyst/activator in toluene and the scavenger in hexane are separately and continuously admitted into the reactor to initiate the polymerization. The reactor temperature is maintained between 35 and 50° C., depending on the target molecular weight. The feed temperature is varied, depending on the polymerization rate to maintain a constant reactor temperature. The polymerization rate is varied from about 0.5 kg/hr to about 4 kg/hr. The propylene and ethylene feeds (at ratios adjusted for target compositions) are mixed in hexane and fed to the reactor. The polymerization catalyst, dimethylsilyl bridged bis-indenyl hafnium dimethyl activated 1.1 molar ratio with N',N'-dimethyl anilinium-tetrakis (pentafluorophenyl)borate is introduced at the rate of at 0.0135 g/hr. A dilute solution of triisobutyl aluminum is introduced into the reactor as a scavenger of catalyst terminators; a rate of approximately 111 mol of scavenger per mole of catalyst is adequate for this polymerization. After the polymerization reaches steady state, a representative sample of the polymer produced in this polymerization is collected, and then steam-distilled to isolate the polymer.

Variations in the composition of the copolymer are obtained principally by changing the ratio of ethylene to propylene. Molecular weight or Mooney Viscosity of the copolymer is varied by either changing the reactor temperature or by changing the ratio of total monomer feed rate to the polymerization rate. The ethylene propylene copolymer used in this invention has an ethylene content of 11.4 wt %, and ML (1+4) 125° C. (Mooney Viscosity) of 30.2.

Preparation of Blends

The mixing involved dry blending the ingredients of each sample, followed by melt homogenization of the batches on a Brabender mixer. The mixing temperature used was in the range 188 to 216° C. The polymers were added first to the mixer and fully fluxed, after which the other ingredients (rubber modifier, extra stabilizers) were incorporated. Mixing was done for 5 minutes at low rotor speed, followed by an additional 5 minutes at high rotor speed. The compounded mix was then dumped and collected in chunks. The molded part property data are shown in Table 1 and 2 below. The measurements involved DSC and tensile properties (ASTM-1078). FIG. 1 shows the crystallization temperature of metallocene ethylene/propylene copolymers with various nucleating agents including diene-modified PP. Clearly, the diene-modified PP shows distinctive nucleating effect when being used at same level as other commercial nucleating agents. FIG. 2 further demonstrates that the diene-modified PP has most profound effect on crystallization temperature of the blends when the diene-modified PP is used in certain concentration levels.

TABLE 1

Nucleating Agent Efficiency of Diene-Modified PP - Blends of Diene-Modified PP with Various Polyolefins

| Examples | 1 | 2 | 3 | 4 | 5 | 6 | 7 | 8 |
| --- | --- | --- | --- | --- | --- | --- | --- | --- |
| M-EP* | 100 | 100 | 100 | 100 | 100 | 100 | 100 | 100 |
| Diene-Modified PP (MFR 5.5) |  | 0.2 |  |  |  |  |  |  |

TABLE 1-continued

Nucleating Agent Efficiency of Diene-Modified PP - Blends of Diene-Modified PP with Various Polyolefins

| Examples | 1 | 2 | 3 | 4 | 5 | 6 | 7 | 8 |
|---|---|---|---|---|---|---|---|---|
| Diene-Modified PP (MFR 2.1) | | | 0.2 | | | | | |
| M-iPP (Achieve 3825, MFR 32)** | | | | 0.2 | | | | |
| ZN-PP (PP3445, MFR 36)*** | | | | | 0.2 | | | |
| Millad | | | | | | 0.2 | | |
| NA-11 | | | | | | | 0.2 | |
| Sodium Benzoate | | | | | | | | 0.2 |
| Stabilizer† | 0.1 | 0.1 | 0.1 | 0.1 | 0.1 | 0.1 | 0.1 | 0.1 |
| DSC | | | | | | | | |
| Tm (° C.), 1st heat | 72.1 | 72.4 | 72 | 73.7 | 73.1 | 73 | 74.7 | 75.6 |
| ☐Hm (j/g), 1st heat | 39.5 | 37.8 | 37.8 | 37.4 | 36 | 38.8 | 37.3 | 34.2 |
| Tc (° C.) | 39.9 | 43.1 | 41.9 | 41.9 | 42.6 | 38.9 | 34.9 | 33.6 |
| ☐Hc (j/g) | 32.3 | 37.6 | 33.1 | 34.6 | 36.8 | 35.9 | 32.2 | 32.8 |
| Tm (° C.), 2nd heat | 77 | 72.6 | 73.3 | 72.4 | 74.8 | 76 | 76.6 | 74.8 |
| ☐Hm (j/g), 2nd heat | 34.3 | 35 | 32.9 | 34.9 | 37 | 36.4 | 34.2 | 38.7 |
| Tensile Test @23° C., 2 in/min. | | | | | | | | |
| Young Modulus (psi) | 7530 | 7600 | 7260 | 6910 | 7230 | 7280 | 7620 | 7680 |
| Yield Stress (psi) | 1130 | 1070 | 1060 | 1030 | 1020 | 1010 | 1040 | 1030 |
| Yield Strain (%) | 44 | 40 | 40 | 39 | 39 | 40 | 39 | 39 |
| Break Stress (psi) | 3780 | 3400 | 3780 | 3390 | 3740 | 3420 | 3480 | 3490 |
| Break Strain (%) | 1210 | 1050 | 1230 | 1190 | 1290 | 1220 | 1270 | 1220 |

*Metallocene-catalyzed ethylene propylene copolymer, ethylene content 11.4%; mooney 30.2
**Commercial metallocene-catalyzed isotactic polypropylene.
***Commercial, conventional isotactic polypropylene.
†Stabilizer was made by mixing Irgafoss 168, Ethanox 330, and Calcium Stearate in 1:1:1 ratio.

TABLE 2

Mechanical and Thermal Characteristic of M-EP/Diene-Modified PP Blends

| Example | 1 | 9 | 2 | 10 | 11 | 12 | 13 | 14 | 15 | 16 | 17 | 18 |
|---|---|---|---|---|---|---|---|---|---|---|---|---|
| M-EP* | 100 | 100 | 100 | 100 | 100 | 98.5 | 97 | 94 | 88 | 75 | 50 | 25 |
| Diene-Modified PP (MFR 5.5) | 0 | 0.1 | 0.2 | 0.4 | 0.8 | 1.5 | 3 | 6 | 12 | 25 | 50 | 75 |
| Stabilizer† | | | | | | | | | | | | |
| DSC | | | | | | | | | | | | |
| Tm (° C.), 1st heat | 72.1 | 74.1 | 72.4 | 73.7 | 73.9 | 72.1 | 69 | 68.8 | 69.9 | 69.9 | 52.6 | 43.9 |
| ☐Hm (j/g), 1st heat | 39.5 | 34.1 | 37.8 | 36.1 | 35.9 | 35.9 | 36.8 | 30.4 | 30.5 | 23.8 | 14.2 | 1.4 |
| Tc (° C.) | 39.9 | 42.3 | 43.1 | 42.9 | 44.5 | 49.6 | 46.1 | 45.4 | 46.5 | 46.4 | 45.8 | — |
| ☐Hc(j/g) | 32.3 | 40.1 | 37.6 | 34.9 | 32.6 | 34.3 | 38.3 | 27.1 | 21.9 | 28.9 | 19.4 | — |
| Tm(° C.), 2nd heat | 77 | 71.8 | 72.6 | 72.2 | 70.9 | 70.2 | 69.9 | 69.8 | 67.5 | 68.5 | 66 | — |
| ☐Hm (j/g), 2nd heat | 34.3 | 35.3 | 35 | 34.7 | 31.7 | 32.2 | 27.6 | 26 | 24.3 | 20.6 | 13.1 | — |
| Tensile Test @23° C., 2 in/min. | | | | | | | | | | | | |
| Young Modulus (psi) | 7530 | 6800 | 7600 | 7300 | 6620 | 6710 | 7030 | 8010 | 8810 | 12190 | 19050 | 29060 |
| Yield Stress (psi) | 1130 | 970 | 1070 | 1040 | 970 | 990 | 1010 | 1150 | 1210 | 1540 | 2200 | 3490 |
| Yield Strain (%) | 44 | 40 | 40 | 40 | 40 | 42 | 41 | 42 | 38 | 32 | 30 | 29 |
| Break Stress (psi) | 3780 | 3420 | 3400 | 3720 | 3420 | 3570 | 3570 | 3950 | 4090 | 4620 | 5040 | 5620 |
| Break Strain (%) | 1210 | 1200 | 1050 | 1270 | 1220 | 1190 | 1260 | 1320 | 1270 | 1230 | 1110 | 1080 |

*Metallocene-catalyzed ethylene propylene copolymer, ethylene content 11.4 wt %; mooney 30.2
†Stabilizer was made by mixing Irgafoss 168, Ethanox 330, and Calcium Stearate in 1:1:1 ratio.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. A polymer composition comprising a blend of:
   a) from 0.01 to 30 weight percent diene-propylene copolymer based on the total polymer composition; and
   b) crystallizable polyolefin comprising from a minimum of 0 to less than 100 percent by weight propylene derived units.

2. The polymer of claim 1 prepared by combining the diene-propylene copolymer of a) with at least 50 weight percent of the crystallizable polyolefin of b) based on the total weight of the polymer composition.

3. The polymer of claim 1 wherein the blend has a Tc of at least 3° C. greater than that of the crystallizable polyolefin alone.

4. The polymer of claim 1 wherein the crystallizable polyolefin is selected from the group consisting of: syndiotactic propylene homopolymer, isotactic propylene-ethylene copolymers, syndiotactic propylene-ethylene copolymer, isotactic $C_4$–$C_{10}$ homopolymer, isotactic propylene-alpha olefin ($C_4$–$C_{18}$) copolymer, polyethylene homopolymer, polyethylene-ethylene alpha olefin ($C_4$–$C_{18}$) copolymers, propylene-ethylene-alpha olefin($C_4$–$C_{18}$) terpolymers, and propylene impact copolymers.

5. The polymer of claim 1 wherein the crystallizable polyolefin is selected from the group consisting of: isotactic propylene-ethylene copolymers, isotactic propylene-alpha olefin ($C_4$–$C_{18}$) copolymer, polyethylene homopolymer, ethylene alpha olefin ($C_4$–$C_{18}$) copolymers, propylene-ethylene-alpha olefin ($C_4$–$C_{18}$) terpolymers, and propylene impact copolymers.

6. The polymer composition of claim 1 wherein the crystallizable polyolefin comprises at least 60 weight percent propylene derived units, and at least 5 weight percent ethylene derived units based on the total composition weight.

7. The polymer composition of claim 1 wherein the crystallizable polyolefin comprises at least 80 weight percent propylene derived units based on the total composition weight.

8. The polymer composition of claim 1 wherein the crystallizable polyolefin comprises at least 90 weight percent propylene derived units based on the total composition weight.

9. The polymer composition of claim 1 wherein the crystallizable polyolefin comprises at least 95 weight percent propylene derived units based on the total composition weight.

10. The polymer composition of claim 1 wherein the crystallizable polyolefin comprises an ethylene-propylene copolymer elastomer comprising 5 to 25% by weight ethylene-derived units and 95 to 75% by weight propylene-derived units, and has a melting point of less than 90° C.

11. The polymer composition of claim 10 wherein the crystallizable polyolefin has a heat of fusion of from 1.0 J/g to 37 J/g and a molecular weight distribution (Mw/Mn) of from 1.5 to 5.

12. The polymer composition of claim 1 prepared by combining from 0.15 to 10 weight percent of the diene-propylene copolymer of a) with the crystallizable polyolefin of b).

13. The polymer composition of claim 1 prepared by combining from 0.15 to 8 weight percent of the diene-propylene copolymer of a) with the crystallizable polyolefin of b).

14. The polymer composition of claim 1 prepared by combining from 0.15 to 5 weight percent of the diene-propylene copolymer of a) with the crystallizable polyolefin of b).

15. The polymer composition of claim 1 prepared by combining from 0.20 to 5 weight percent of the diene-propylene copolymer of a) with the crystallizable polyolefin of b).

16. The polymer composition of claim 1 wherein the diene-propylene copolymer of a) comprises propylene derived units and from 0.001 to 2.0 weight percent diene derived units.

17. The polymer composition of claim 1 wherein the diene-propylene copolymer of a) comprises propylene derived units and from 0.003 to 1.5 weight percent diene derived units.

18. The polymer composition of claim 1 wherein the diene-propylene copolymer of a) comprises propylene derived units and from 0.005 to 1.0 weight percent diene derived units.

19. The polymer composition of claim 1 wherein the diene-propylene copolymer of a) consists essentially of propylene derived units and from 0.01 to 2.0 weight percent diene derived units.

20. A polymer composition comprising a blend of:
   a) from 0.01 to 10 weight percent diene-propylene copolymer based on the total polymer composition weight; and
   b) crystallizable polyolefin comprising at least 5% by weight ethylene derived units.

21. The polymer of claim 20 prepared by combining the diene-propylene copolymer of a) with at least 50 weight percent of the crystallizable polyolefin of b) based on the total weight of the polymer composition.

22. The polymer of claim 20 wherein the blend has a Tc of at least 3° C. greater than that of the crystallizable polyolefin alone.

23. The polymer of claim 20 wherein the crystallizable polyolefin is selected from the group consisting of: isotactic propylene-ethylene copolymers, polyethylene homopolymers, isotactic terpolymers, polyethylene copolymers, polyethylene terpolymers, and propylene impact copolymers.

24. The polymer composition of claim 20 wherein the crystallizable polyolefin comprises at least 72 weight percent propylene derived units, and at least 5 weight percent ethylene derived units based on the total composition weight.

25. The polymer composition of claim 20 wherein the crystallizable polyolefin comprises at least 80 weight percent propylene derived units based on the total composition weight.

26. The polymer composition of claim 20 wherein the crystallizable polyolefin comprises at least 90 weight percent propylene derived units based on the total composition weight.

27. The polymer composition of claim 20 wherein the crystallizable polyolefin comprises at least 95 weight percent propylene derived units based on the total composition weight.

28. The polymer composition of claim 20 wherein the crystallizable polyolefin comprises an ethylene-propylene copolymer elastomer comprising 5 to 25% by weight ethylene-derived units and 95 to 75% by weight propylene-derived units, and has a melting point of less than 90° C.

29. The polymer composition of claim 28 wherein the crystallizable polyolefin has a heat of fusion from 1.0 J/g to 37 J/g and a molecular weight distribution (Mw/Mn) from 1.5 to 5.

30. The polymer composition of claim 20 prepared by combining from 0.15 to 10 weight percent of the diene-propylene copolymer of a) with at least 50 weight percent of the crystallizable polyolefin of b).

31. The polymer composition of claim 20 prepared by combining from 0.15 to 8 weight percent of the diene-propylene copolymer of a) with at least 50 weight percent of the crystallizable polyolefin of b).

32. The polymer composition of claim 20 prepared by combining from 0.15 to 5 weight percent of the diene-propylene copolymer of a) with at least 50 weight percent of the crystallizable polyolefin of b).

33. The polymer composition of claim 20 prepared by combining from 0.20 to 5 weight percent of the diene-propylene copolymer of a) with at least 50 weight percent of the crystallizable polyolefin of b).

34. (original) The polymer composition of claim 20 wherein the diene-propylene copolymer of a) comprises propylene derived units and from 0.001 to 2.0 weight percent diene derived units.

35. The polymer composition of claim 20 wherein the diene-propylene copolymer of a) comprises propylene derived units and from 0.003 to 1.5 weight percent diene derived units.

36. The polymer composition of claim 20 wherein the diene-propylene copolymer of a) comprises propylene derived units and from 0.005 to 1.0 weight percent diene derived units.

37. The polymer composition of claim 20 wherein the diene-propylene copolymer of a) consists essentially of propylene derived units and from 0.01 to 2.0 weight percent $\alpha,\omega$-diene derived units.

38. A polymer composition obtained by blending:
   a) from 0.01 to 30 weight percent diene-propylene copolymer based on the total polymer composition weight; and
   b) at least 50 weight percent crystallizable polyolefin comprising at least 5% by weight ethylene derived units;
   wherein the polymer composition has a Tc at least 3° C. greater than that of the crystallizable polyolefin alone.

39. The polymer of claim 38 prepared by combining the diene-propylene copolymer of a) with at least 50 weight percent of the crystallizable polyolefin of b) based on the total weight of the polymer composition.

40. The polymer of claim 38 wherein the blend has a Tc of at least 5° C. greater than that of the crystallizable polyolefin alone.

41. The polymer of claim 38 wherein the crystallizable polyolefin is selected from the group consisting of: isotactic propylene-ethylene copolymers, isotactic propylene-alpha olefin ($C_4$–$C_{18}$) copolymer, polyethylene homopolymer, ethylene alpha olefin ($C_4$–$C_{18}$) copolymers, propylene-ethylene-alpha olefin ($C_4$–$C_{18}$) terpolymers, and propylene impact copolymers.

42. The polymer composition of claim 38 wherein the crystallizable polyolefin comprises at least 72 weight percent propylene derived units, and at least 5 weight percent ethylene derived units based on the total composition weight.

43. The polymer composition of claim 38 wherein the crystallizable polyolefin comprises at least 80 weight percent propylene derived units based on the total composition weight.

44. The polymer composition of claim 38 wherein the crystallizable polyolefin comprises at least 90 weight percent propylene derived units based on the total composition weight.

45. The polymer composition of claim 38 wherein the crystallizable polyolefin comprises at least 95 weight percent propylene derived units based on the total composition weight.

46. The polymer composition of claim 38 wherein the crystallizable polyolefin comprises an ethylene-propylene copolymer elastomer comprising 5 to 25% by weight ethylene-derived units and 95 to 75% by weight propylene-derived units, and has a melting point of less than 90° C.

47. The polymer composition of claim 46 wherein the crystallizable polyolefin has a heat of fusion of from 1.0 J/g to 37 J/g and a molecular weight distribution (Mw/Mn) of from 1.5 to 5.

48. The polymer composition of claim 38 prepared by combining from 0.15 to 10 weight percent of the diene-propylene copolymer of a) with at least 50 weight percent of the crystallizable polyolefin of b).

49. The polymer composition of claim 38 prepared by combining from 0.15 to 8 weight percent of the diene-propylene copolymer of a) with at least 50 weight percent of the crystallizable polyolefin of b).

50. The polymer composition of claim 38 prepared by combining from 0.15 to 5 weight percent of the diene-propylene copolymer of a) with at least 50 weight percent of the crystallizable polyolefin of b).

51. The polymer composition of claim 38 prepared by combining from 0.20 to 5 weight percent of the diene-propylene copolymer of a) with at least 50 weight percent of the crystallizable polyolefin of b).

52. The polymer composition of claim 38 wherein the diene-propylene copolymer of a) comprises propylene derived units and from 0.001 to 2.0 weight percent diene derived units.

53. The polymer composition of claim 38 wherein the diene-propylene copolymer of a) comprises propylene derived units and from 0.003 to 1.5 weight percent diene derived units.

54. The polymer composition of claim 38 wherein the diene-propylene copolymer of a) comprises propylene derived units and from 0.005 to 1.0 weight percent diene derived units.

55. The polymer composition of claim 38 wherein the diene-propylene copolymer of a) consists essentially of propylene derived units and from 0.01 to 2.0 weight percent $\alpha,\omega$-diene derived units.

* * * * *